UNITED STATES PATENT OFFICE.

NORMAN V. RANDOLPH, OF RICHMOND, VIRGINIA, ASSIGNOR TO THE RANDOLPH PAPER BOX CO., OF SAME PLACE.

COMPOSITION FOR RENDERING CARDBOARD, &c., IMPERVIOUS TO GREASE.

SPECIFICATION forming part of Letters Patent No. 668,565, dated February 19, 1901.

Application filed November 14, 1900. Serial No. 36,524. (No specimens.)

*To all whom it may concern:*

Be it known that I, NORMAN V. RANDOLPH, a citizen of the United States, residing at Richmond, in the county of Henrico and State of Virginia, have invented certain new and useful Improvements in a Composition for Rendering Paper, Cardboard, Thin Wood, and the Like Impervious to Grease; and I do hereby declare the following to be a full, clear, and exact description of the invention, such as will enable others skilled in the art to which it appertains to make and use the same.

My invention relates to a composition for rendering paper, cardboard, and the like impervious to grease; and it consists in bringing together certain ingredients in a proper manner, whereby a paste preparation is produced which can be readily applied by brush or otherwise to the surface of the paper or cardboard before the latter has been shaped to form any desired article or after an article has been produced from such material and when applied will render the paper or board impervious to grease.

The composition consists of the following ingredients, combined in about the proportions stated to produce a given quantity of the composition, viz: silicate of soda, eleven pounds; mica, one-fourth pound; glycerin, ten ounces; sugar, preferably brown sugar, one-fourth pound; rice-flour, four ounces; gum-arabic, four ounces; prepared chalk, two ounces.

I first take the silicate of soda, mica, and glycerin and mix them thoroughly together in a suitable vessel, and then add the brown sugar, (which has previously been dissolved in water, preferably hot water,) rice-flour, (also dissolved in water,) gum-arabic, (which has been reduced to a thin liquid with hot water,) and the prepared chalk. I find that by carrying out this method the ingredients are more satisfactorily brought together and the best results are obtained. I do not, however, wish to limit my invention to this exact manner of mixing the ingredients.

The glycerin, brown sugar, and prepared chalk are used in the preparation for the purpose of making the same pliable when in liquid form. The rice-flour and prepared chalk are for the purpose of making a smooth soft surface and also to prevent the paste from being too dark. The silicate of soda alone, while being the largest component part, is of little value without the other ingredients, for when employed without said ingredients it cracks to such an extent when it dries as to render it useless as a coating for grease-proof paper. When the paste has been thoroughly mixed and dissolved according to the above formula, it is preferably spread upon the paper or board with a fine brush and allowed to dry, and the paper is then ready for use.

I do not wish to limit my invention to the exact proportions named, as some material will require a thicker paste than others, and consequently the proportions will have to be varied accordingly. The proportions given are adapted to produce a paste of the proper consistency for general application, though it may be made a little thicker or a little thinner by adding more or less of some of the ingredients.

Having now described my invention, what I claim as new, and desire to secure by Letters Patent, is—

1. A composition for rendering paper, cardboard, and the like impervious to grease, which consists of silicate of soda, mica, glycerin, sugar, rice-flour, gum-arabic and prepared chalk mixed together in about the proportions set forth, substantially as described.

2. A composition for rendering paper, cardboard, and the like, impervious to grease, which consists of silicate of soda, eleven pounds, mica, one-fourth pound, glycerin, ten ounces, brown sugar, one-fourth pound, rice-flour, four ounces, gum-arabic, four ounces, and prepared chalk two ounces, substantially as described.

3. The process of producing a composition for rendering paper, cardboard and the like impervious to grease, which consists in mixing silicate of soda, mica and glycerin together, and then adding dissolved brown sugar, dissolved rice-flour and dissolved gum-arabic and prepared chalk, substantially as described.

In testimony whereof I hereunto affix my signature in presence of two witnesses.

NORMAN V. RANDOLPH.

Witnesses:
GEO. WATT,
P. G. SOWERS.